No. 773,778. PATENTED NOV. 1, 1904.
G. W. BEGOLE.
HOOK.
APPLICATION FILED DEC. 2, 1903.
NO MODEL.

Witnesses.

Inventor.
Gordon W. Begole.
by Edward N. Pagelsen.
his Attorney.

No. 773,778.  
Patented November 1, 1904.

UNITED STATES PATENT OFFICE.

GORDON W. BEGOLE, OF HASTINGS, MICHIGAN.

HOOK.

SPECIFICATION forming part of Letters Patent No. 773,778, dated November 1, 1904.

Application filed December 2, 1903. Serial No. 183,499. (No model.)

*To all whom it may concern:*

Be it known that I, GORDON W. BEGOLE, a citizen of the United States, residing at Hastings, in the county of Barry and State of Michigan, have invented a new and Improved Hook, of which the following is a specification.

My invention relates to checkrein-hooks; and the objects of my improvement are to provide a hook that shall be light and strong and that can be made at a low cost. These objects I attain in the construction shown in the accompanying drawings, in which—

Figure 1:
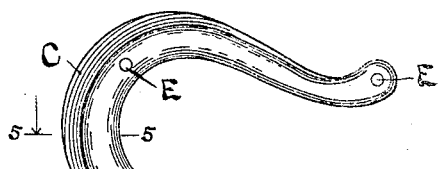
Figure 3:
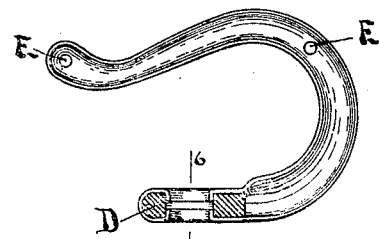
Figure 2:
Figure 4:
Figure 5:
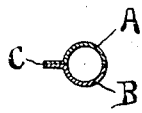
Figure 6:
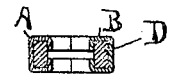

Figure 1 is a side view, and Fig. 2 is a plan, of one style of my hooks. Fig. 3 is a side view of one-half of a modified form of the hook. Fig. 4 is a view of the reinforcing center piece. Fig. 5 is a cross-section on the line 5 5 of Fig. 1. Fig. 6 is a cross-section on the line 6 6 of Fig. 3.

Similar reference characters refer to like parts throughout the drawings.

Checkrein-hooks and similar hooks for other purposes are either of forged or cast metal. If of forged metal, the expense of making and finishing them is too high. If of cast metal, the weight must necessarily be great, so as to provide the necessary strength. To avoid the high price of one and the weight of the other, I construct a hook made of two parts, each stamped out of a blank of sheet steel, brass, or any other desired metal, secure the two halves together, and finish the product in any desired manner.

The hook shown in Figs. 1 and 2 is formed of two pieces A and B, stamped so as to have a general semicylindrical cross-section which tapers from the base toward the point where they are slightly enlarged. On the outer edge the metal is turned outward at right angles, so that when the two parts are secured together the rib C is formed, which adds greatly to the strength of the hook. The base of each half is formed to receive one-half of the reinforcing center piece D, and when the two halves are placed together and inclose the piece D the sheet metal is bent into the opening in D, as shown in Figs. 5 and 6. This center piece thus serves to strengthen the base of the hook and to secure the base ends of the two halves together. Rivets passing through the holes E also serve to hold the halves together. The contact edges and rib-faces of the two halves are preferably ground flat, so as to form a perfect joint. The two halves may be soldered or brazed together, if desired.

Fig. 3 shows the inner side of one half-hook made without the strengthening-rib.

The hook shown may be secured to the saddles of harnesses by means of bolts passing through the openings in the bases. Hooks of any desired form may be made in similar manner and secured by means of one or more attaching-screws passing through the base.

Having now explained my improvement, what I claim as my invention, and desire to secure by Letters Patent, is—

1. As a new article of manufacture, a hook composed of two pieces of sheet metal secured together, said hook having a flat base, a reinforcing-piece in said base having an opening, the metal of the two parts of the hook being bent to engage in said opening.

2. As a new article of manufacture, a hollow hook composed of two halves of sheet metal, each half having an extended flange on one side and a flattened base, said flanges contacting and forming a stregthening-rib, a metal reinforcing-piece inclosed by the base of the hook and having an opening, the metal of the halves of the hook being bent to engage in said opening so the two parts are held together by said reinforcing-piece, and rivets to further secure said halves together.

In testimony whereof I have signed my name to this specification in the presence of two subscribing witnesses.

GORDON W. BEGOLE.

Witnesses:
CHAS. H. THOMAS,
MYRA L. FIRSTER.